(12) United States Patent
Ortiz et al.

(10) Patent No.: US 9,268,059 B2
(45) Date of Patent: Feb. 23, 2016

(54) DOWNHOLE SENSOR TOOL FOR LOGGING MEASUREMENTS

(71) Applicant: HALLIBURTON ENERGY SERVICES, INC., Houston, TX (US)

(72) Inventors: Ricardo Ortiz, Houston, TX (US); Michael Dewayne Finke, Cypress, TX (US); Kristopher V. Sherrill, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/531,576

(22) Filed: Nov. 3, 2014

(65) Prior Publication Data

US 2015/0053393 A1 Feb. 26, 2015

Related U.S. Application Data

(63) Continuation of application No. 13/321,548, filed as application No. PCT/US2010/035672 on May 20, 2010.

(60) Provisional application No. 61/180,081, filed on May 20, 2009.

(51) Int. Cl.
*G01V 5/00* (2006.01)
*G01V 13/00* (2006.01)
*G01V 5/12* (2006.01)
*G01V 5/04* (2006.01)
*G01V 5/08* (2006.01)
*E21B 47/01* (2012.01)
*E21B 47/12* (2012.01)

(52) U.S. Cl.
CPC ............... *G01V 13/00* (2013.01); *E21B 47/01* (2013.01); *E21B 47/12* (2013.01); *G01V 5/04* (2013.01); *G01V 5/08* (2013.01); *G01V 5/12* (2013.01)

(58) Field of Classification Search
CPC ........... G01V 5/12; G01V 5/08; G01V 13/00; G01V 5/04
USPC ....................................................... 250/254
See application file for complete search history.

(56) References Cited

U.S. PATENT DOCUMENTS 4,692,908 A * 9/1987 Ekstrom et al. ................ 367/27
2010/0132434 A1 * 6/2010 Moake ........................... 73/1.82

FOREIGN PATENT DOCUMENTS

WO WO-2010135591 A3 11/2010

OTHER PUBLICATIONS

Intellectual Property Corporation of Malaysia, Substantive Examination Adverse Report, Feb. 13, 2015, 5 Pages.

* cited by examiner

*Primary Examiner* — Kiho Kim

(57) ABSTRACT

A downhole measurement apparatus includes a tool body supporting a logging tool. The logging tool includes a detector outsert coupled into and exposed through an exterior pocket of the tool body to position the outer surface of the outsert adjacent or in close proximity to the outer diameter of the tool body. A stabilizer or off-center stabilizer may be provided to further deflect the outsert portion of the logging tool toward an earth formation to increase detector proximity to the formation. Radial and axial distances can be calibrated and maintained across multiple different tool collars.

12 Claims, 21 Drawing Sheets

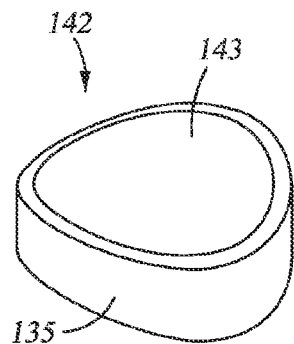
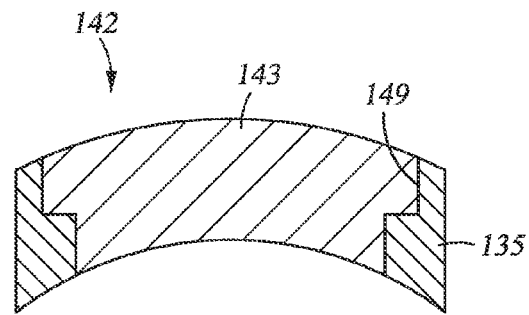
Fig. 20  Fig. 21
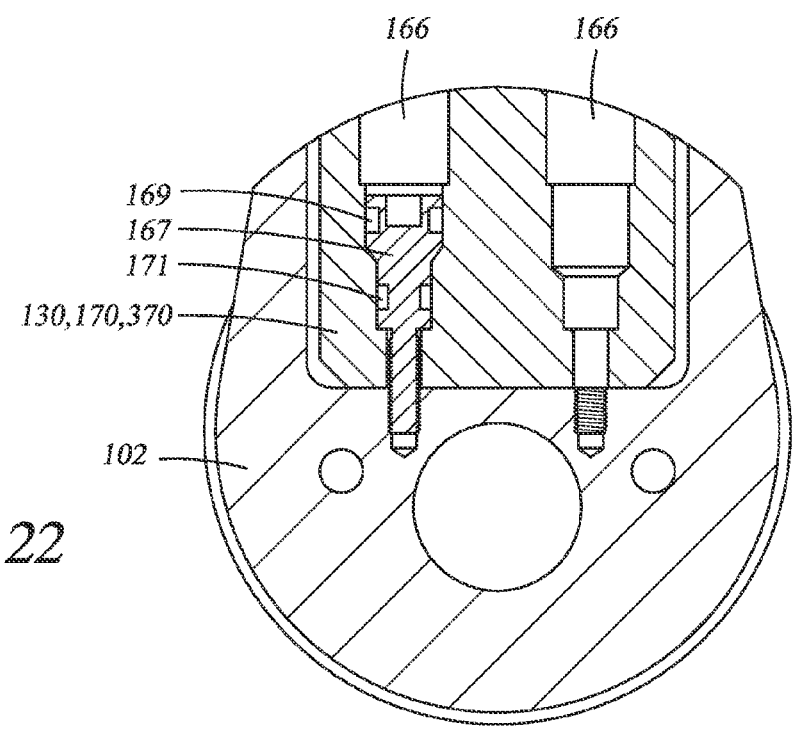
Fig. 22

DOWNHOLE SENSOR TOOL FOR LOGGING MEASUREMENTS

CROSS-REFERENCE TO RELATED APPLICATIONS

This application is a continuation of U.S. patent application Ser. No. 13/321,548 filed Nov. 19, 2011, entitled "Downhole Sensor Tool for Nuclear Measurements," which is the U.S. National Stage under 35 U.S.C. §371 of International Patent Application No. PCT/US2010/035672 filed May 20, 2010, entitled "Downhole Sensor Tool for Nuclear Measurements," which claims the benefit of U.S. provisional application Ser. No. 61/180,081 filed May 20, 2009, entitled "Downhole Sensor Tool for Nuclear Measurements," all of which are hereby incorporated herein by reference in their entirety.

BACKGROUND

Successful drilling, completion and production of an earthen wellbore requires that information be gathered about the downhole formation from which hydrocarbons are produced. Measurement systems are lowered into a drilled wellbore to determine wellbore parameters and operating conditions. A portion of the measurement system includes a sensor package for detecting the wellbore parameters and conditions, such as formation properties, tool and borehole direction, drilling fluid properties, dynamic drilling conditions, and others. The sensor package may be lowered on a tool body after the drill string is tripped out of the borehole, such as with a typical wireline operation. Alternatively, the sensors may be housed in a drill collar and adapted for taking measurements while drilling, as in certain applications known as measurement-while-drilling (MWD) or logging-while-drilling (LWD). In addition to the sensor portion, a sensor tool may also include a processor and associated storage medium for retaining the sensed information. With respect to a MWD/LWD tool, a telemetry system is often used to transmit the sensed information uphole. The telemetry system may include a mud pulser, an acoustic telemetry option, or an electromagnetic transmission system.

The sensors and associated electronic and mechanical components are packaged within the tool body. For example, the sensors and detectors may be hardwired within the tool body and accessible via removable hatches. In another arrangement, the sensors are mounted upon a chassis and retained within an outer housing or sleeve. Such arrangements place certain tool components between the interior sensing and logging devices, and the target formation or fluids exterior of the tool. Sensitive logging devices, such as nuclear measurement devices using gamma rays, can be affected by the intervening tool components. Furthermore, the intervening hatches, housings, sleeves, drill collar material, stabilizer sleeves and the like place the nuclear sources and sensors further from the formation.

In addition, the varying demands of the hydrocarbon field require expensive measurement tools to be useable across different tool bodies and drill collars, including tool bodies and drill collars having different sizes. Therefore, it becomes necessary to deploy a nuclear measurement tool that addresses these shortcomings as well as others in the field.

BRIEF DESCRIPTION OF THE DRAWINGS

For a detailed description of exemplary embodiments of the disclosure, reference will now be made to the accompanying drawings in which:

FIG. 20 shows a perspective view of the assembled detector window including the components of FIGS. 18 and 19;

FIG. 21 shows a cross-section view of the assembled detector window of FIG. 20;

FIG. 22 shows a cross-section of the tool of FIG. 6 taken at the section 15-15;

DETAILED DESCRIPTION

Figure 1:
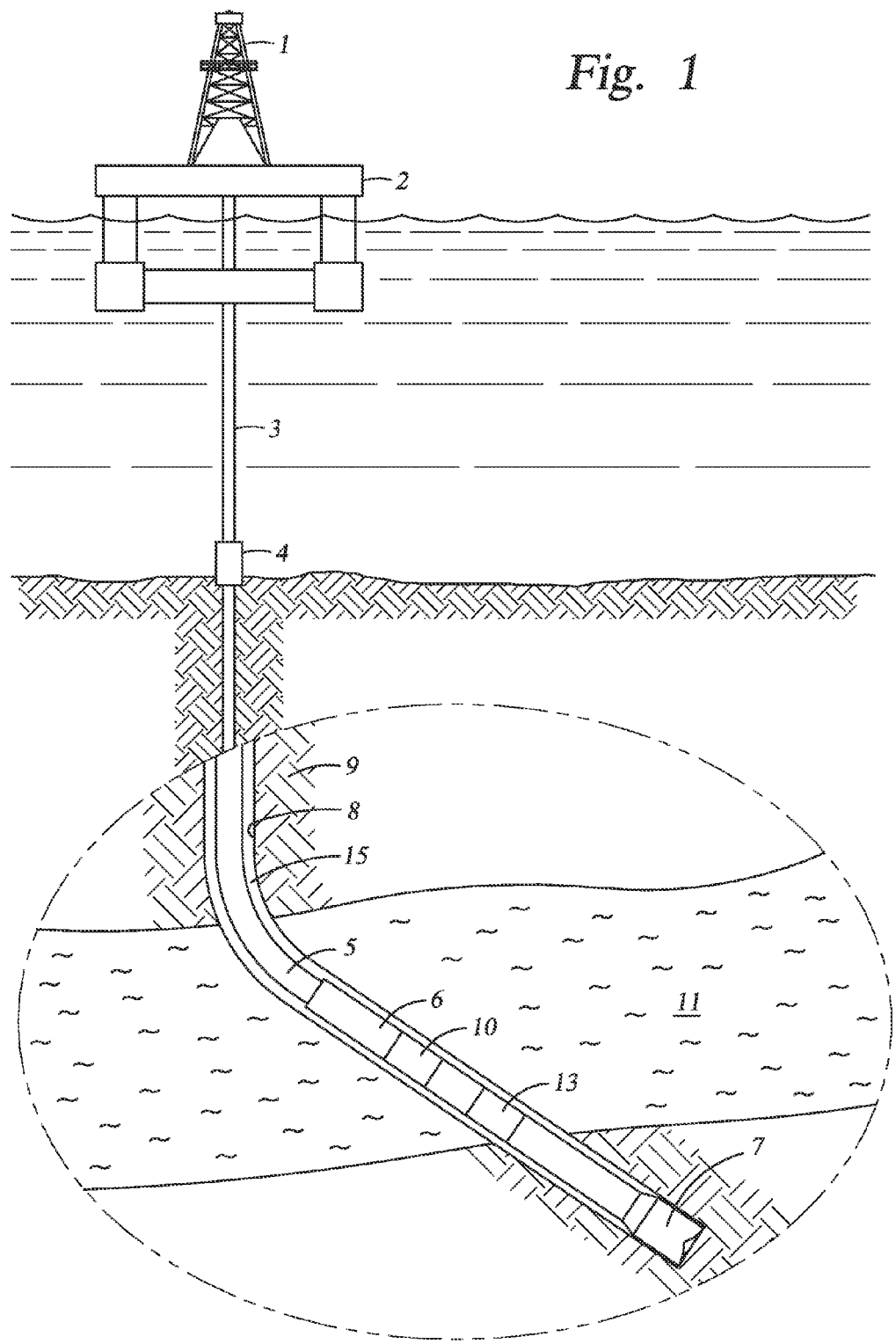
FIG. 1 shows a schematic side view of an exemplary drill string and bottom hole assembly including a MWD/LWD drill collar assembly.

In the drawings and description that follow, like parts are typically marked throughout the specification and drawings with the same reference numerals. The drawing figures are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

In the following discussion and in the claims, the terms "including" and "comprising" are used in an open-ended fashion, and thus should be interpreted to mean "including, but not limited to . . . ". Unless otherwise specified, any use of any form of the terms "connect", "engage", "couple", "attach", or any other term describing an interaction between elements is not meant to limit the interaction to direct interaction between the elements and may also include indirect interaction between the elements described. Reference to up or down will be made for purposes of description with "up", "upper", "upwardly" or "upstream" meaning toward the surface of the well and with "down", "lower", "downwardly" or "downstream" meaning toward the terminal end of the well, regardless of the well bore orientation. In addition, in the discussion and claims that follow, it may be sometimes stated that certain components or elements are in fluid communication. By this it is meant that the components are constructed and interrelated such that a fluid could be communicated between them, as via a passageway, tube, or conduit. Also, the designation "MWD" or "LWD" are used to mean all generic measurement while drilling or logging while drilling apparatus and systems. The various characteristics mentioned above, as well as other features and characteristics described in more detail below, will be readily apparent to those skilled in the art upon reading the following detailed description of the embodiments, and by referring to the accompanying drawings.

Referring initially to FIG. 1, a drilling apparatus including a downhole sensor or LWD tool is shown. A downhole sensor or LWD tool 10 is shown enlarged and schematically as a part of a bottom hole assembly (BHA) 6 including a sub 13 and a drill bit 7 at its distal most end. The bottom hole assembly 6 is lowered from a drilling platform 2, such as a ship or other conventional land platform, via a drill string 5. The drill string 5 is disposed through a riser 3 and a well head 4. Conventional drilling equipment (not shown) is supported within a derrick 1 and rotates the drill string 5 and the drill bit 7, causing the bit 7 to form a borehole 8 through formation material 9. The drill bit 7 may also be rotated using other means, such as a downhole motor. The borehole 8 penetrates subterranean zones or reservoirs, such as reservoir 11, that are believed to contain hydrocarbons in a commercially viable quantity. An annulus 15 is formed thereby. In addition to the tool 10, the bottom hole assembly 6 contains various conventional apparatus and systems, such as a down hole drill motor, a rotary steerable tool, a mud pulse telemetry system, MWD or LWD sensors and systems, and others known in the art.

The tool 10, as well as other parts of the BHA 6, includes a drill collar assembly that may carry additional MWD/LWD system components. Additional MWD/LWD system components include, for example, a processor and storage medium, a power supply such as batteries or a turbine for generating electrical power, a telemetry device, hydraulic operating circuits, sensors, and other components. The present disclosure is not limited to the additional MWD/LWD components listed specifically herein as it is known for these systems to include other components, such other components being contemplated by the present disclosure.

The drill collar and tool assembly 10 includes embodiments of the sensor tool described herein. It should be noted, however, that the drill collar and MWD/LWD assembly is only one conveyance that may be used to lower the sensor package embodiments into the borehole 8, and is used for clarity of description. Alternatively, the sensor package may be coupled to a longitudinal body conveyed downhole using other means. The present invention is not limited to the specific conveyance used for description purposes, but instead may be used with other conveyances such as coiled tubing, wired coiled tubing, wired drillpipe, wireline and others.

Figure 2:
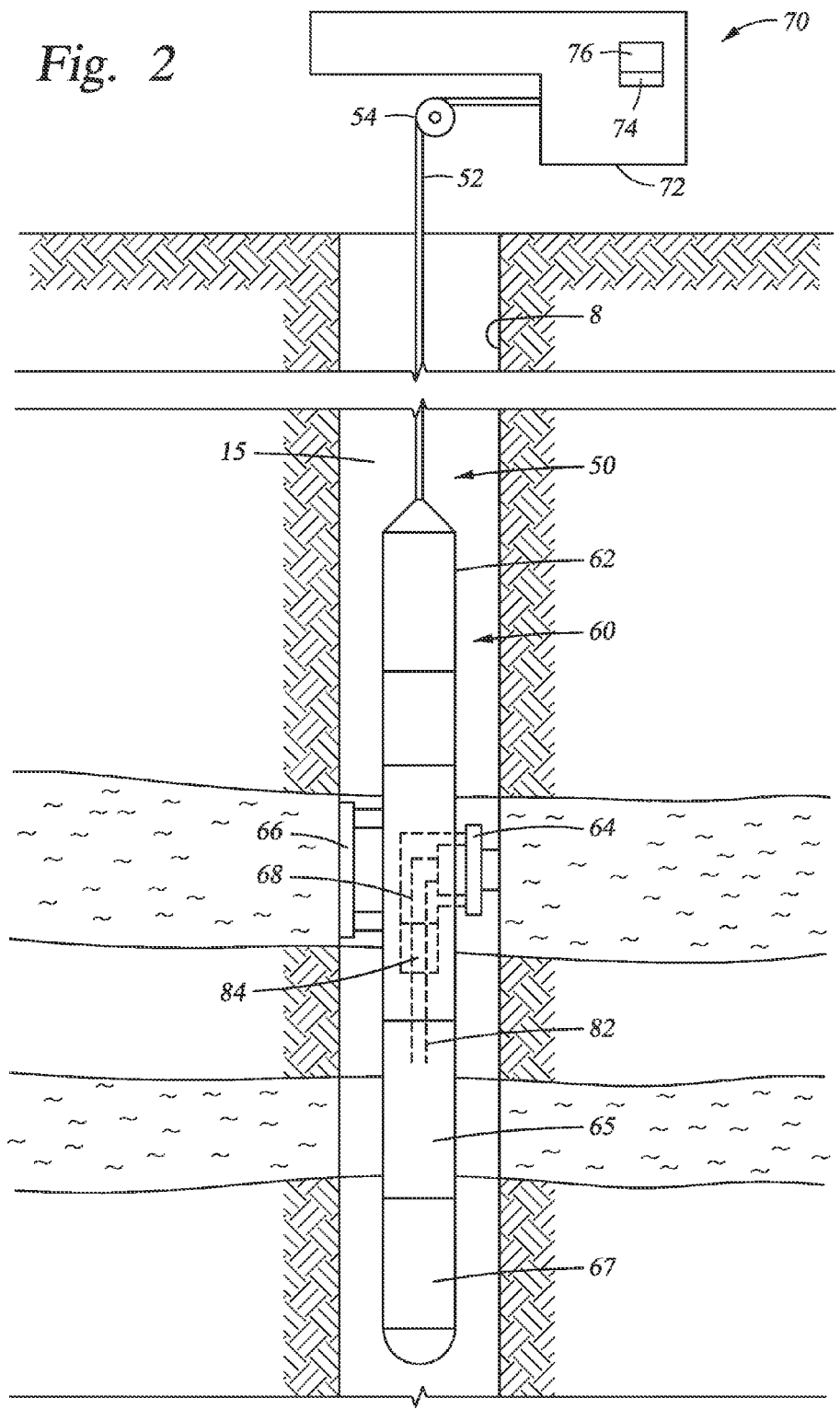
FIG. 2 is a schematic view, partly in cross-section, of a sensor tool conveyed by wireline.

In some embodiments, and with reference to FIG. 2, a sensor tool 60 is disposed on a tool string 50 conveyed into the borehole 8 by a cable 52 and a winch 54. The sensor tool includes a body 62, a sampling assembly 64, a backup assembly 66, analysis modules 68, 84 including electronic devices, a flowline 82, a battery module 65, and an electronics module 67. The sensor tool 60 is coupled to a surface unit 70 that may include an electrical control system 72 having an electronic storage medium 74 and a control processor 76. In other embodiments, the tool 60 may alternatively or additionally include an electrical control system, an electronic storage medium and a processor.

Figure 3:
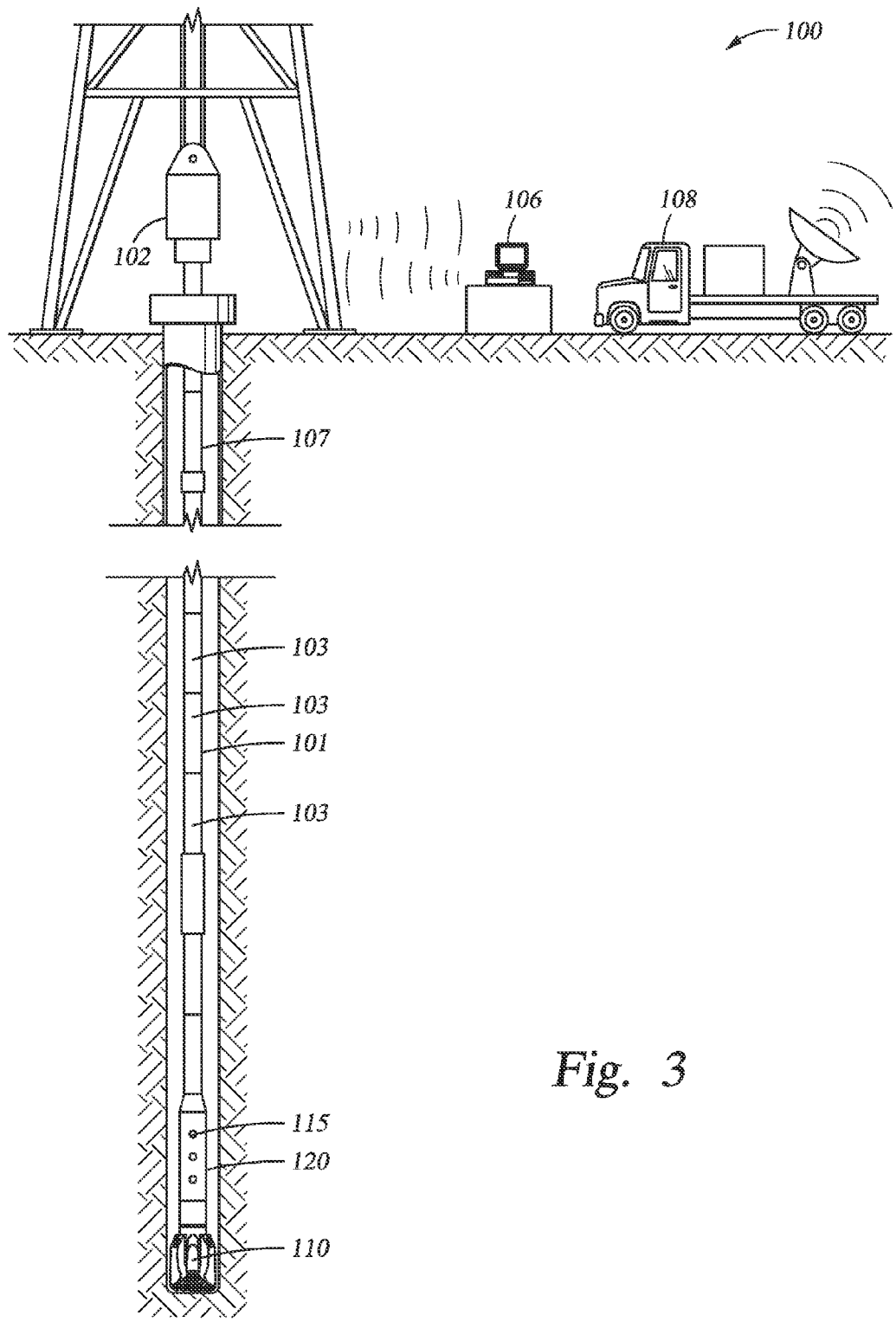
FIG. 3 is a schematic view, partly in cross-section, of a sensor tool disposed on a wired drill pipe connected to a telemetry network.
Figure 4:
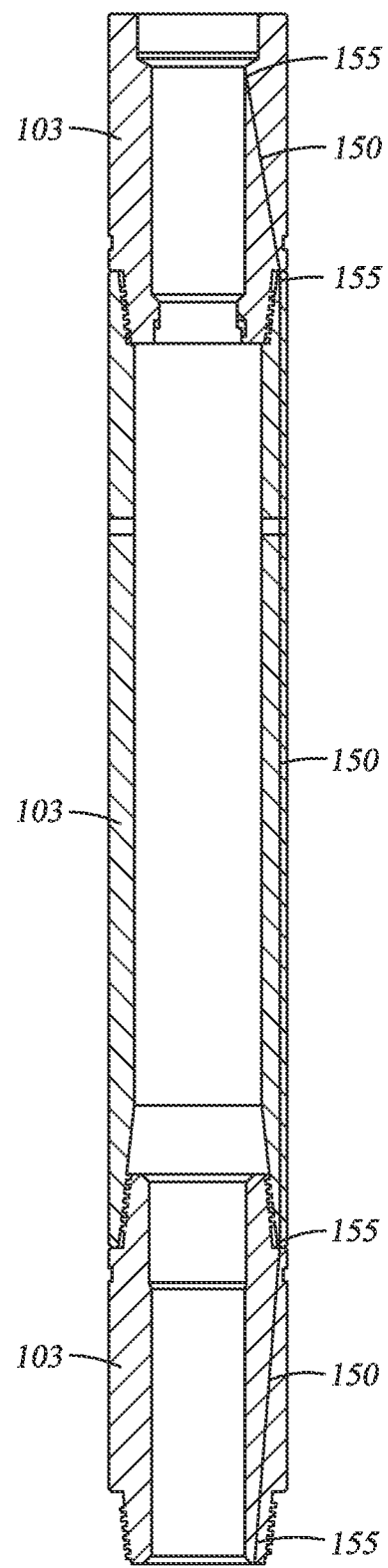
FIG. 4 is a cross-section view of a section of wired drill pipe.

Referring to FIG. 3, a telemetry network 100 is shown. A sensor tool 120 is coupled to a drill string 101 formed by a series of wired drill pipes 103 connected for communication across junctions using communication elements. Referring to FIG. 4, sections of wired drill pipe 103 are shown including conductors 150 that traverse the entire length of the pipe sections. Communication elements 155 allow the transfer of power and/or data between the pipe sections 103. A data/power signal may be transmitted along a pipe section of the wired drill string, such as the tool 120, from one end through the conductor(s) 150 to the other end across the communication elements 155.

It will be appreciated that work string 101 can be other forms of conveyance, such as coiled tubing or wired coiled tubing. The downhole drilling and control operations are interfaced with the rest of the world in the network 100 via a top-hole repeater unit 102, a kelly 107 or top-hole drive (or, a transition sub with two communication elements), a computer 106 in the rig control center, and an uplink 108. The computer 106 can act as a server, controlling access to network 100 transmissions, sending control and command signals downhole, and receiving and processing information sent up-hole. The software running the server can control access to the network 100 and can communicate this information via dedicated land lines, satellite uplink 108), Internet, or other means to a central server accessible from anywhere in the world. The sensor tool 120 is shown linked into the network 100 just above the drill bit 110 for communication along its conductor path and along the wired drill string 101.

Portions of wired drill pipes 103 may be subs or other connections means. In some embodiments, the conductor(s) 150 comprise coaxial cables, copper wires, optical fiber cables, triaxial cables, and twisted pairs of wire. The ends of the wired subs 103 are configured to communicate within a downhole network as described herein. The communication elements 155 may comprise inductive couplers, direct electrical contacts, optical couplers, and combinations thereof. The conductor 150 may be disposed through a hole formed in the walls of the outer tubular members of the pipes 103.

The tool 120 may include a plurality of transducers 115 disposed on the tool 120 to relay downhole information to the operator at surface or to a remote site. The transducers 115 may include any conventional source/sensor (e.g., pressure, temperature, gravity, etc.) to provide the operator with formation and/or borehole parameters, as well as diagnostics or position indication relating to the tool. The telemetry network 100 may combine multiple signal conveyance formats (e.g., mud pulse, fiber-optics, acoustic, EM hops, etc.). It will also be appreciated that software/firmware may be configured into the tool 120 and/or the network 100 (e.g., at surface, downhole, in combination, and/or remotely via wireless links tied to the network).

Referring now to FIGS. 5-8, the sensor tool body 10 may include an exemplary embodiment of a nuclear measurement tool 100. For purposes of description with reference to the figures, a nuclear measurement tool is described. Exemplary nuclear measurement logs include neutron porosity and gamma-gamma density, in which the corresponding tools employ a nuclear source and various spaced detectors in a sensor package and provide the density of fluids in the wellbore and formation as well as other fundamental characterizing properties of the formation. Further exemplary tools may not require a nuclear source, such as a neutron generator wherein a charged particle accelerator produces high-energy neutrons. In most cases for the aforementioned nuclear tools, the tool executes and obtains a close proximity measurement relative to the surrounding formation and formation fluids. In the context of the embodiments described herein, other sensor and measurement tools can also be employed to obtain various downhole formation property data. Further examples of other close proximity measurement tools include resistivity, acoustic, and imaging.

Figure 5:
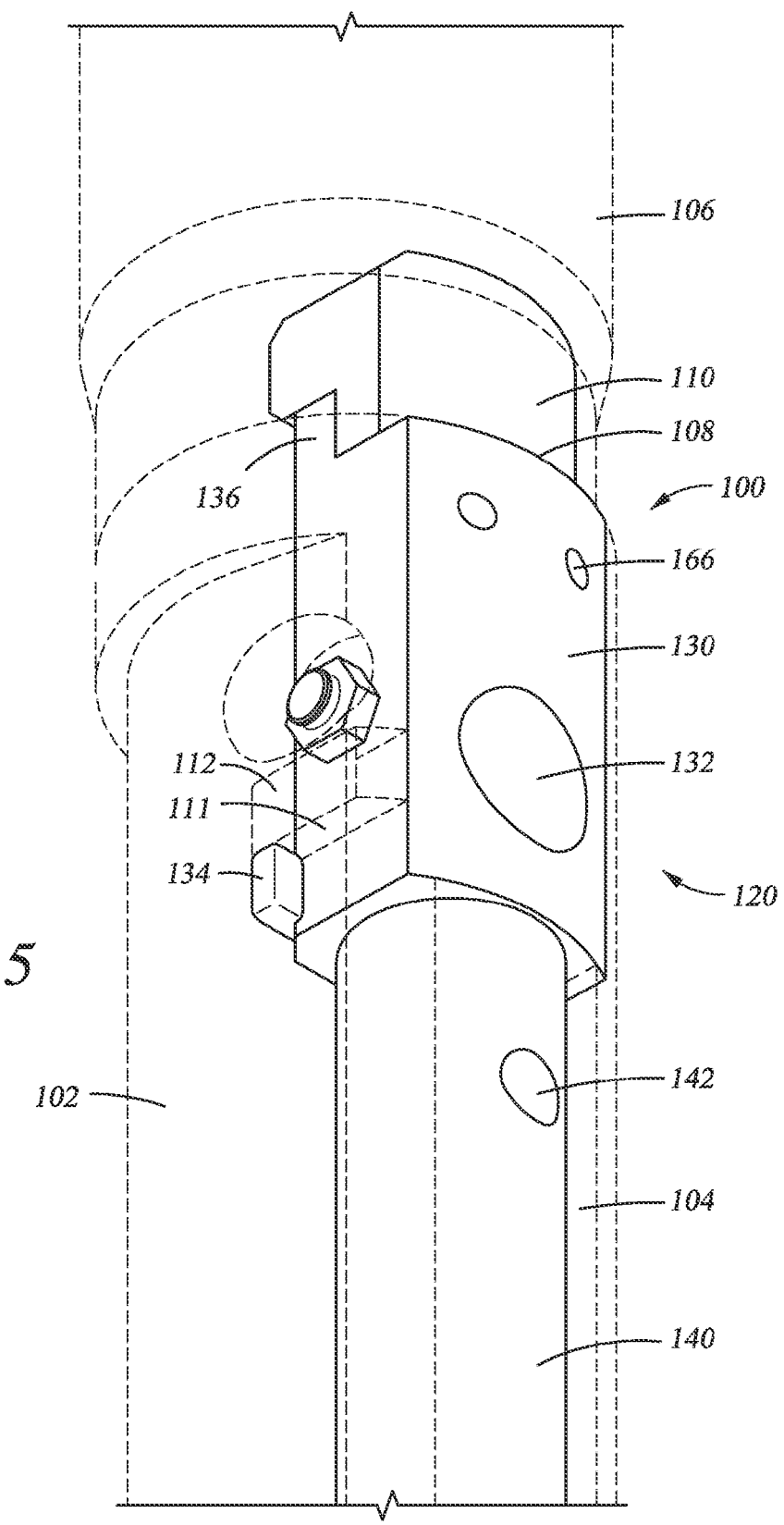
FIG. 5 shows a perspective view, in partial phantom, of an exemplary nuclear measurement tool in accordance with principles disclosed herein.
Figure 6:
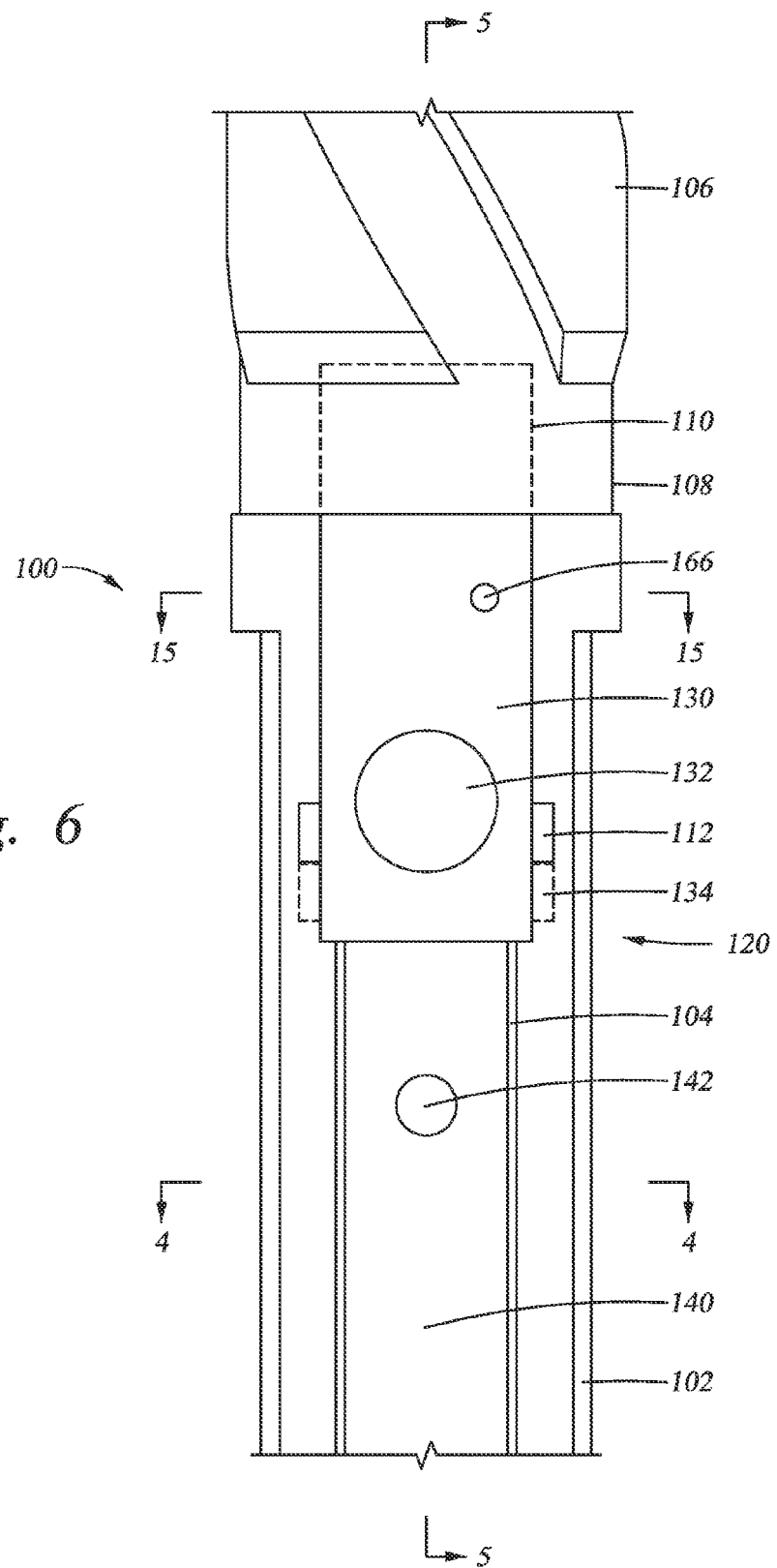
FIG. 6 shows a top view of the tool of FIG. 5.

Referring to FIGS. 5 and 6, the tool 100 includes a drill collar or body 102 having a pocket 104 formed therein. In some embodiments, the drill collar is a mono-bladed drill collar. The pocket 104 receives a sensor package 120 comprising a sensor outsert 140 and a nuclear source holder 130 coupled thereto. A stabilizer sleeve 106 includes a retaining end 108 that overlaps a spacer 110 and a shoulder 136 of the source holder 130 to capture and retain the spacer 110 and source holder 130. Portions of the collar 102 and the stabilizer sleeve 108 are shown in phantom to reveal the details of the sensor package 120 as it is connected into the pocket 104. The outsert 140 includes a detector window 142, and the source holder includes a source emitting window 132. In some embodiments, the source emitting window comprises Titanium or other low-z materials. The source holder 130 includes various retention features comprising tabs 134 received within pocket receptacles 111, 112, bores 166 for receiving retention screws, and the previously mentioned shoulder 136 captured by the overlying spacer 110 and stabilizer retaining end 108.

The term "outsert" will refer to a pressure housing, sonde, or other containment vehicle provided in an outer pocket of the drill collar or tool body. Such a pressure housing is accessible from an exterior of the tool, and places the radially outermost dimension of the pressure housing while in the pocket coincident with or substantially adjacent the outer diameter of the drill collar. An outsert may be contrasted with an "insert" wherein a housing receives a sensor case and a cover or sleeve is disposed over the housing to retain the sensor cases. These sensor cases are termed "inserts" because they are internal to the tool (within the cover or sleeve) and, if sealed, are dependent on the cover or sleeve or other external pressure case for sealing from the environment exterior of the tool. An insert is not accessible from an exterior of the tool. Additional details regarding a tool with sealed sensor outserts are found in U.S. provisional patent application No. 61/180, 071 filed 20 May 2009 and entitled Downhole Sensor Tool with a Sealed Sensor Outsert, and the corresponding international application number PCT/US2010/035663 filed 20 May 2010 and entitled Downhole Sensor Tool with a Sealed Sensor Outsert.

Figure 7:
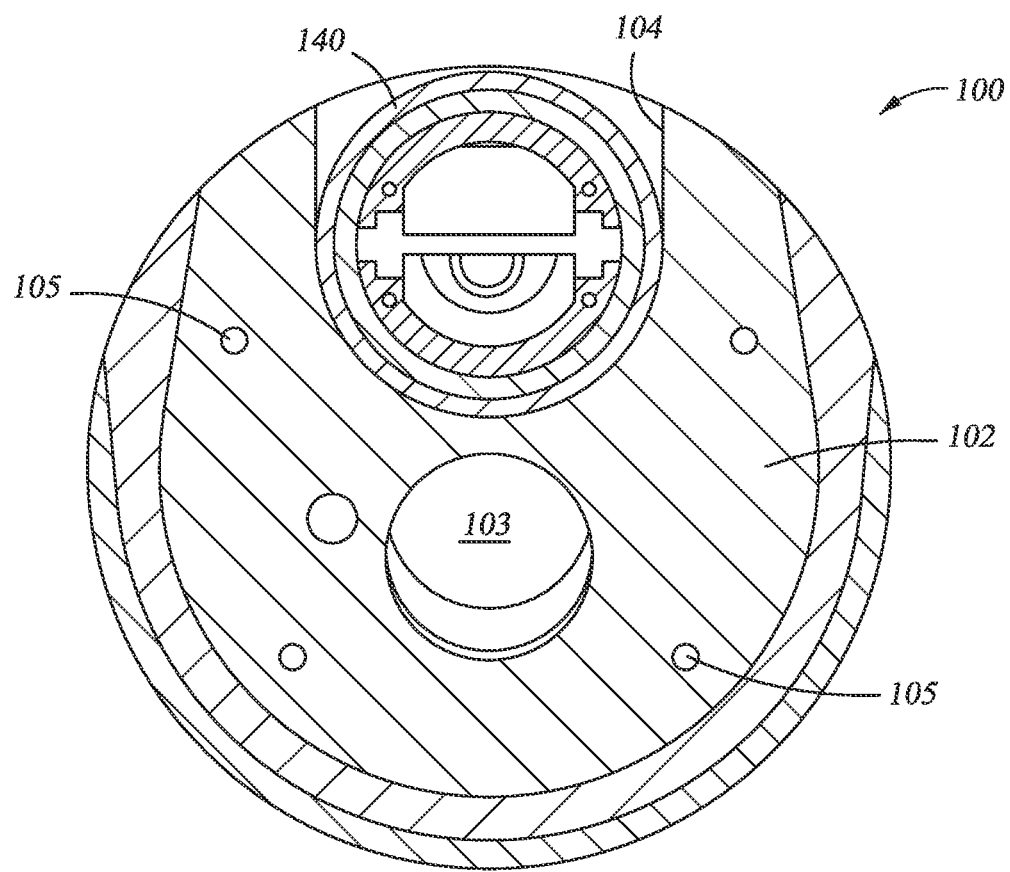
FIG. 7 shows a cross-section view of the tool of FIG. 6 taken at the section 4-4.

Referring now to FIG. 7, a radial section view of the tool 100 shows the outsert 140 as mounted in the pocket 104 of the drill collar 102. The pocket 104 and the outsert 140 are offset from the longitudinal axis of the tool 100 to allow for the primary drilling fluid flow bore 103, or other flow bore as required by the various alternative tool conveyances as described herein. For example, a wired drillpipe or wired coiled tubing may include wire or other conduits 105 located in various radial positions in the collar 102 and extending longitudinally therethrough.

Figure 8:
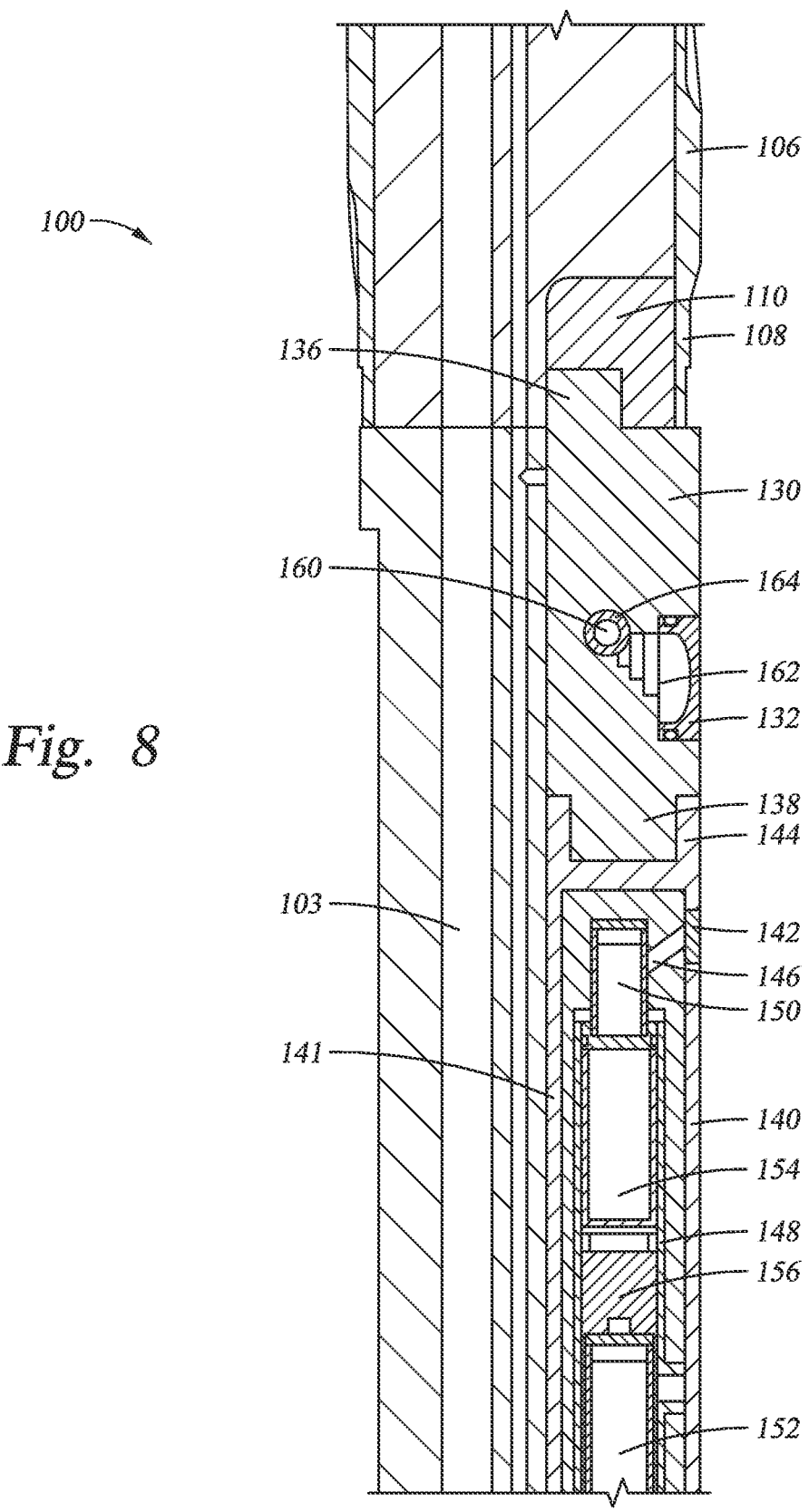
FIG. 8 shows a cross-section view of the tool of FIG. 6 taken at the section 5-5.
Figure 9:
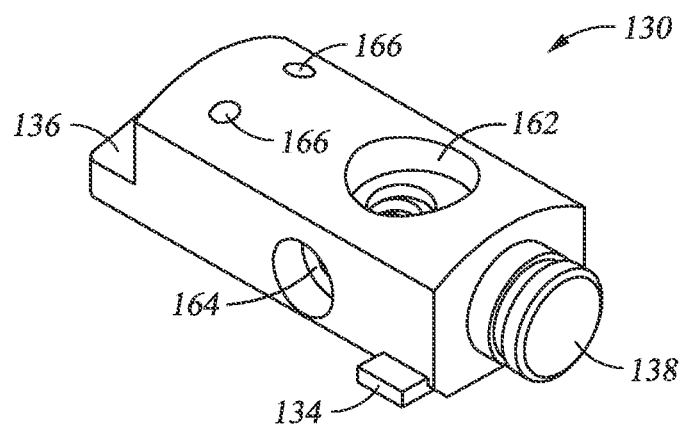
FIG. 9 shows a perspective view of the nuclear source holder of the tool of FIGS. 5, 6 and 8.
Figure 10:
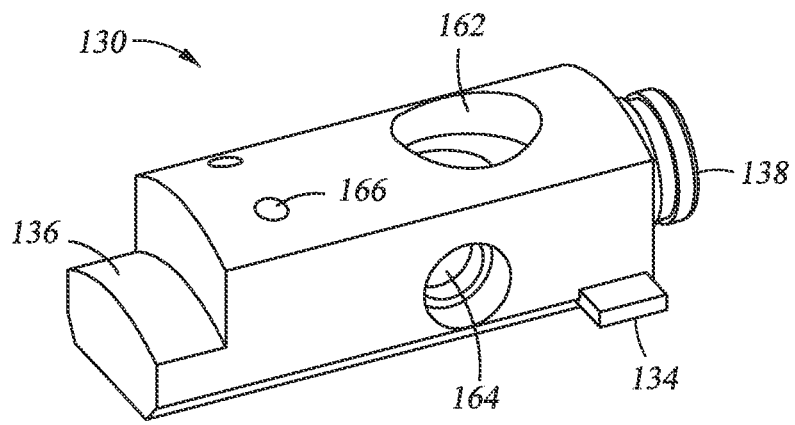
FIG. 10 shows another perspective view of the source holder of FIG. 9.
Figure 11:
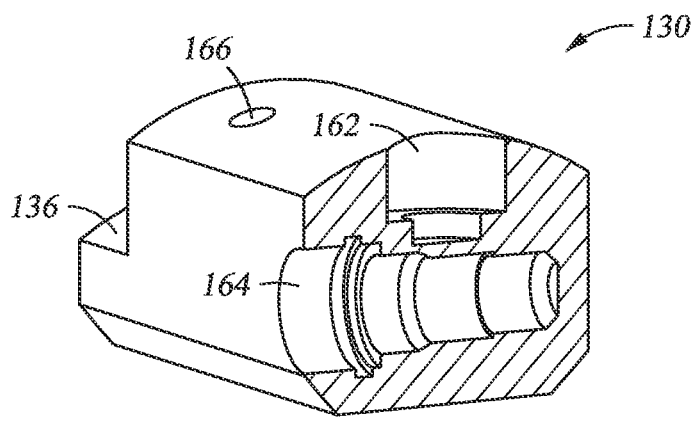
FIG. 11 shows another perspective view, in cross-section, of the source holder of FIG. 9.

Referring next to FIG. 8, a longitudinal section view of the tool 100 reveals additional details of the sensor package 120 and its retention in the pocket 104. The stabilizer sleeve 106 is slidable such that the end 108 slides over and captures the spacer 110 and the shoulder 136. The source holder 130 includes a nuclear source 160 installed below the source emitting window 132. With additional reference to FIGS. 9-11, the window 132 covers a cavity or pocket 162 that communicates with a passageway 164. The nuclear source 160 is threaded into or otherwise secured in the passageway 164. A boss 138 on the source holder receives an open end 144 of a pressure housing 141 of the outsert 140. In some embodiments, the end 144 of the outsert 140 is shrink fitted onto the boss 138. The pressure housing 141 includes an inner shield 148 retaining a first, near detector 150 relative to the nuclear source 160 and a second, far detector 152. Though multiple detectors are shown and described, some embodiments include a single detector. Also included within the inner shield 148 are electronics and other sensor components 154, 156.

The detector window 142 provides a protected port through the pressure housing 141, and a collimation path 146 in the inner shield 148 provides communication between the detector 150 and the window 142 such that nuclear emissions sent from the nuclear source 160 and into the surrounding environment and formation can ultimately be received and detected by the detectors 150, 152. In certain applications, such as MWD/LWD, the detector window 142 allows nuclear emissions to be received by the detectors for measurement purposes while drilling. Because the radial dimension of the window 142 is coincident with or adjacent the outer diameter of the tool, the window 142, and thus the port to the detectors, is placed in close proximity to the formation. Further, because the window 142 is part of an exposed outsert unimpeded by any other part of the tool, the detectability of the nuclear emissions is maximized. The combination of these features, along with the radially stabilizing effect of the stabilizer 106, provides a measurement in close proximity to the formation that is consistent and calibrated. The axial distance between the nuclear source or generator and the detectors is calibrated in the tool even across different tool sizes and different borehole sizes. Similarly, the radial distance between the detector window and the formation is predictable and calibrated across various tool and borehole sizes.

Figure 12:
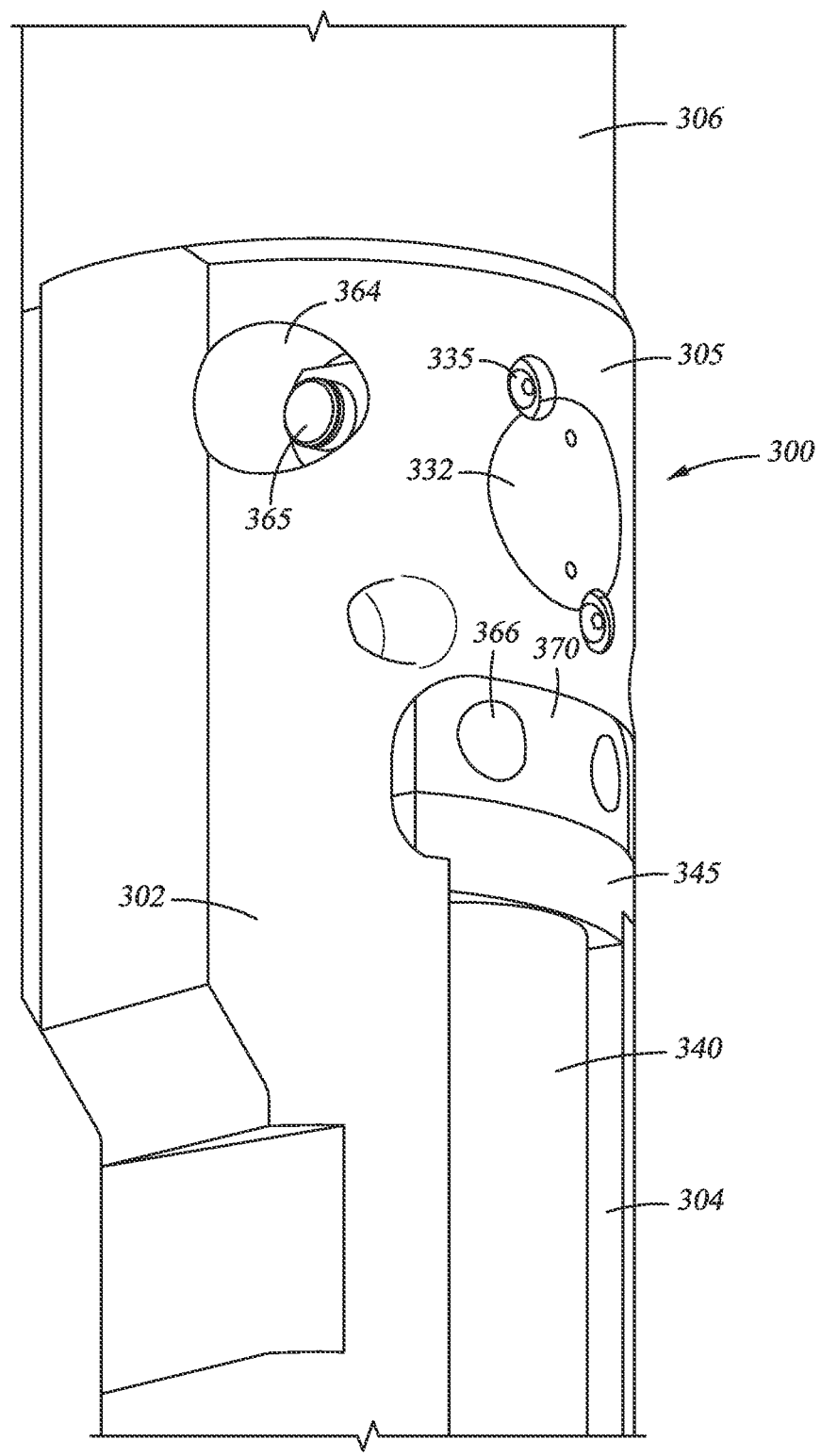
FIGS. 12-14 are perspective views of an alternative embodiment of a nuclear measurement tool including an integrated source holder portion in accordance with principles disclosed herein.
Figure 13:
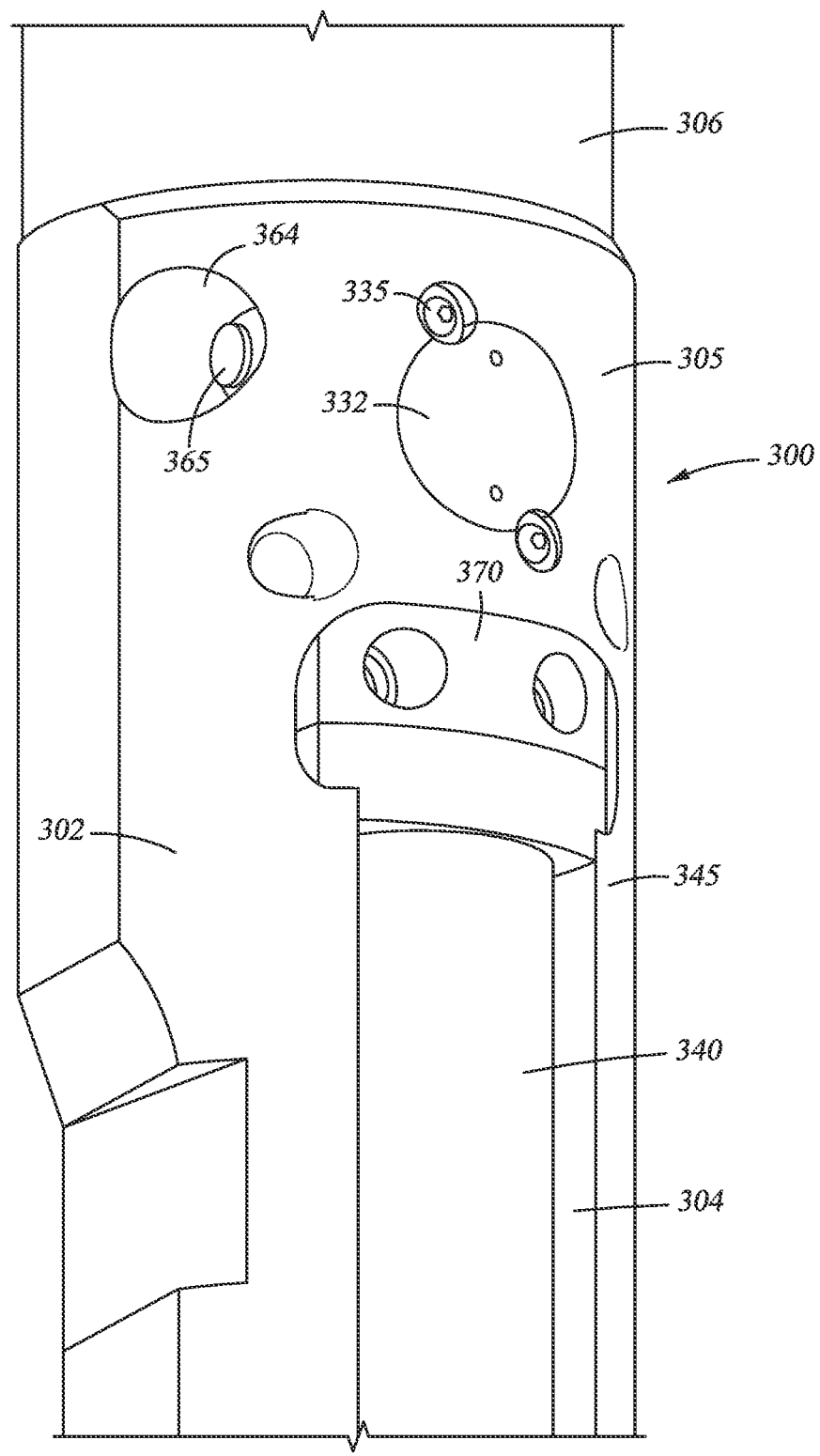
Figure 14:
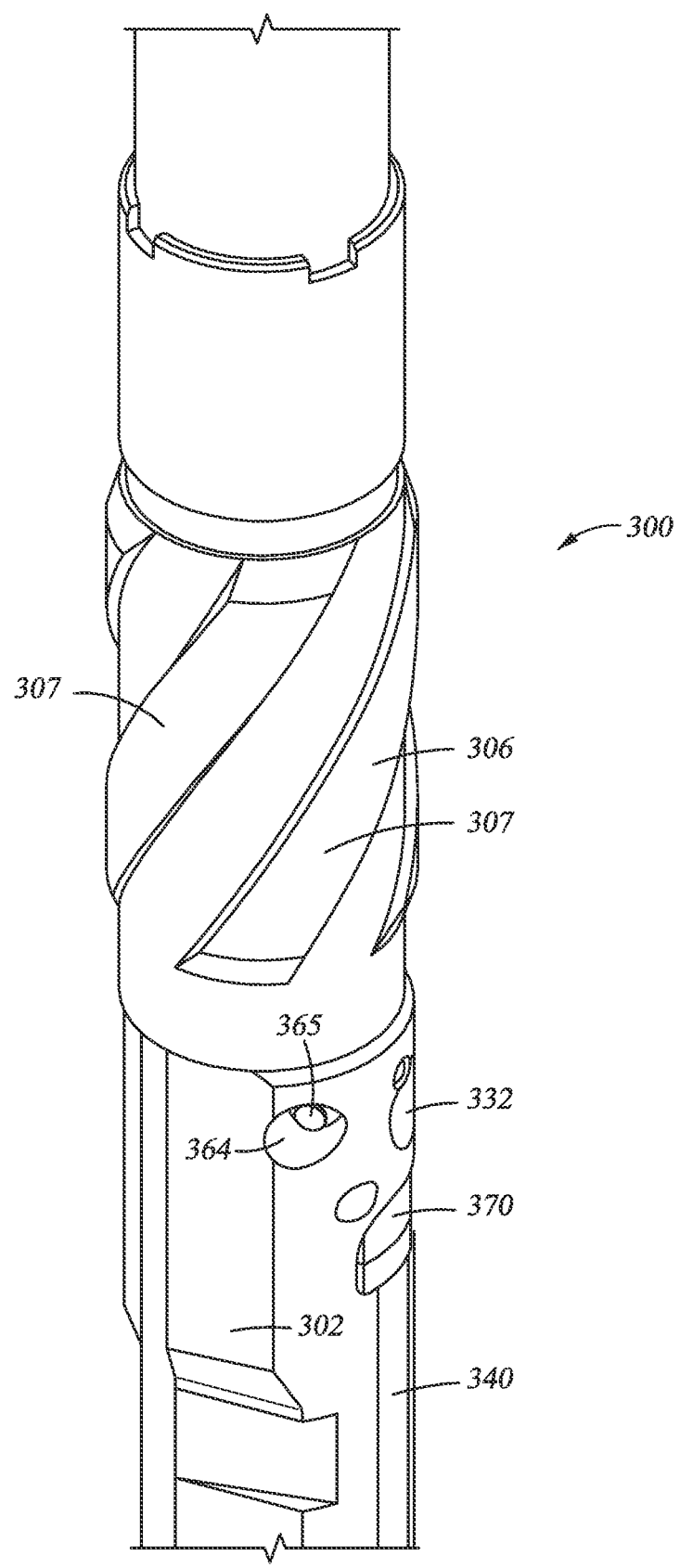

Referring now to FIGS. 12 and 13, an alternative embodiment is shown as nuclear measurement tool 300. A drill collar 302 includes a pocket 304 supporting a sensor outsert 340 consistent with outsert embodiments described herein. The outsert 340 may include an end portion 345 engaged with an axial spacer block 370 secured by hydrostatic screws inserted though holes 366. Instead of a separate nuclear source holder coupled into the drill collar, the drill collar 302 includes a portion 305 adapted to receive and secure the nuclear source. The source portion 305 includes an internal source cavity and passage (not shown) covered by a source emitting window 332 secured by screws 335. The source portion 305 also includes a source passage 364 to receive and secure the nuclear source or other nuclear member. The source passage 364 includes a cover or cap 365. The integrated source holder portion 305 further assists in providing a consistent, calibrated, and close proximity between the nuclear source and detector assembly and the surrounding formation. In the axial direction, the integrated source holder portion 305 also provides consistency and built-in calibration between the nuclear source assembly and the detectors or logging sensors. Radial stabilization is further enhanced by a stabilizer 306, as shown in FIG. 14, with stabilizer blades 307.

Figure 15:
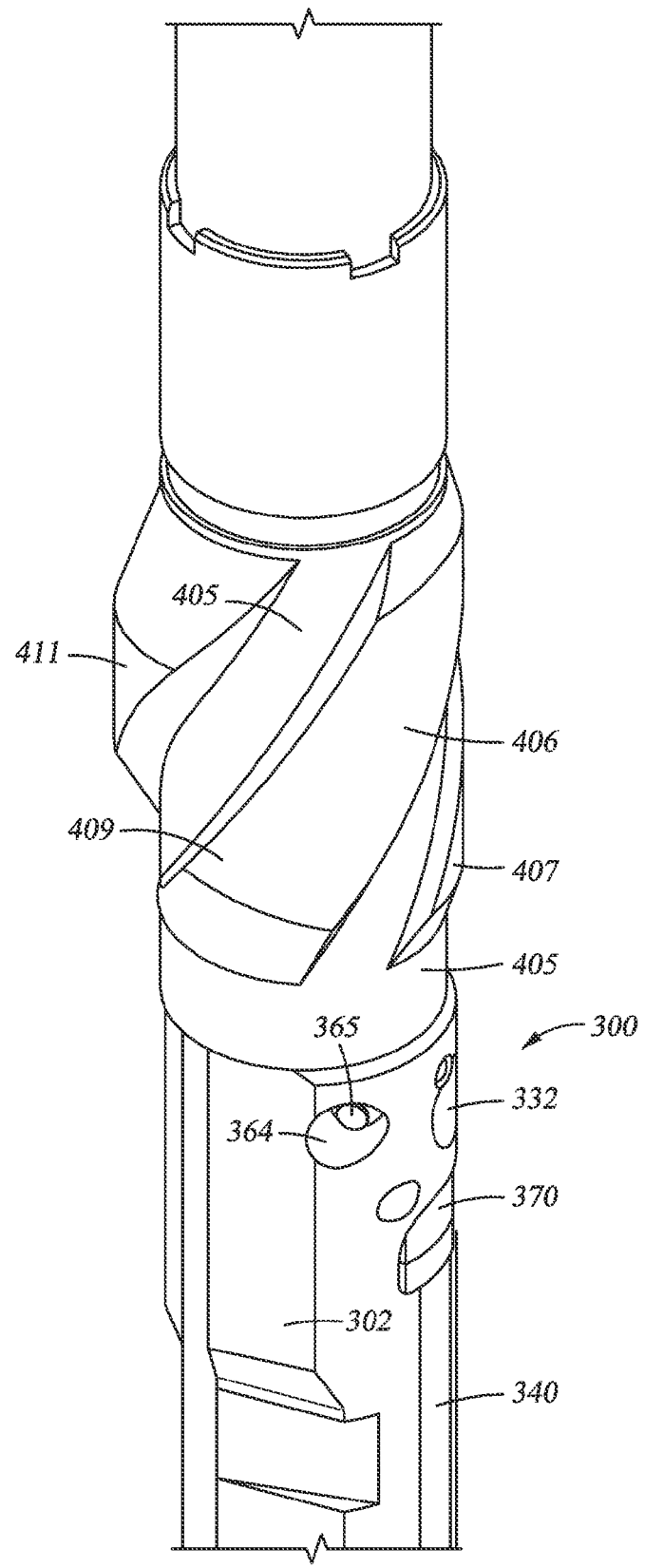
FIG. 15 is a perspective view of the nuclear measurement tool of FIGS. 12-14 including an alternative off-center stabilizer.

In a further embodiment, the tool 300 may also be outfitted with a stabilizer 406 as shown in FIG. 15. The stabilizer 406 includes blades 407, 409, 411 of varying and increasing radial heights from the base surface 405. Thus, the stabilizer 406 is an off-center or eccentric stabilizer. In some embodiments, the blade 411 with the largest radial height may be positioned opposite the direction of the source emitting window 332 such that the distance between the formation and the detectors or logging sensors is maintained and calibrated.

Figure 16:
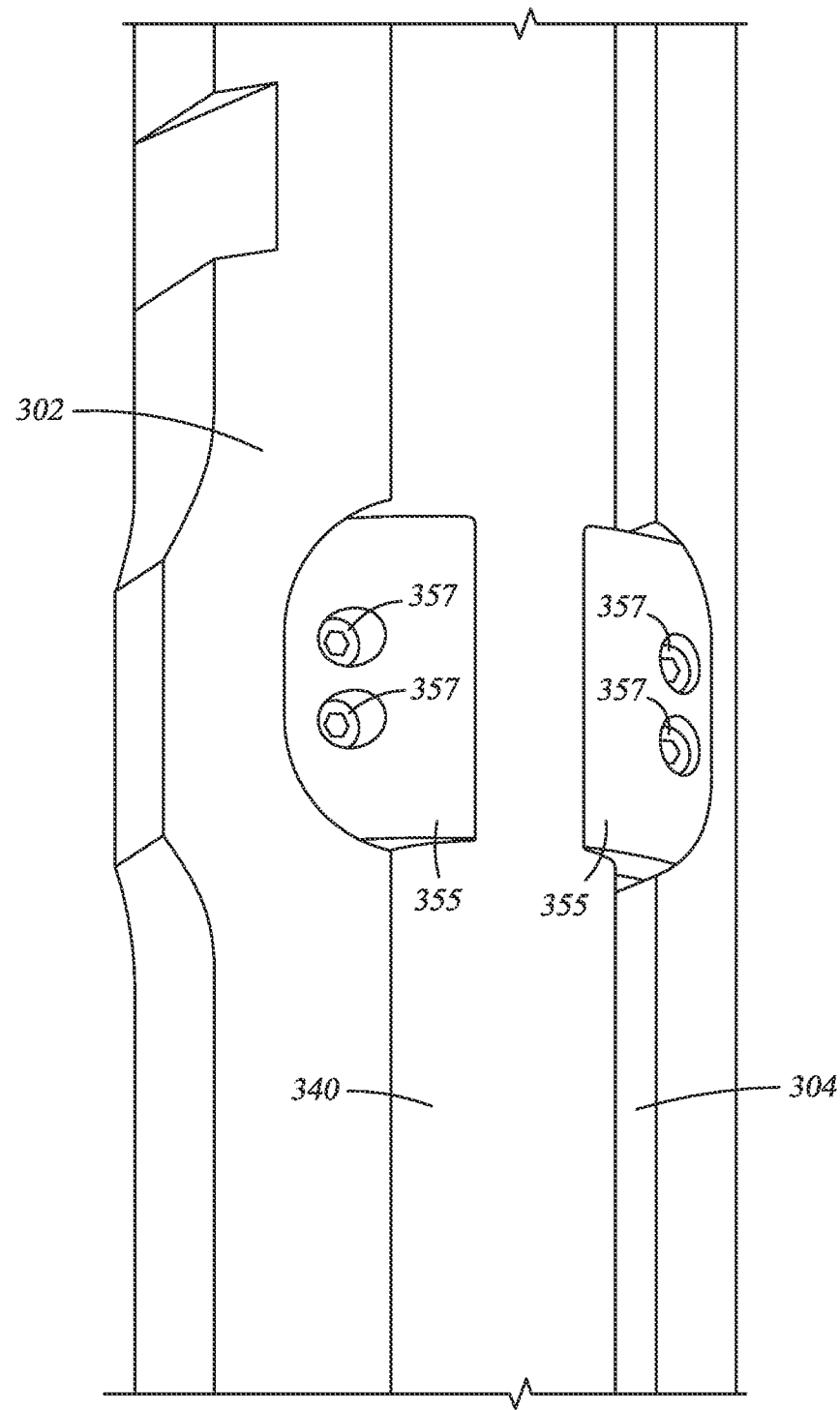
FIG. 16 is a perspective view of finger retention mechanisms for the outserts of the previously shown nuclear measurement tools.

Referring to FIG. 16, the outsert 340 may be retained in the pocket 304 by one or more retention members or fingers 355 coupled to the collar 302 by bolts 357. In some embodiments, the fingers 355 are coupled into recesses adjacent the pocket 304. In some embodiments, the fingers 355 do not extend across the circumferential distance of the outer surface of the outsert 340 that is exposed through the pocket 304, nor do they extend the axial length of the outsert 340 or outsert pocket 304.

In certain embodiments, the outserts 140, 340 are density outserts, such as density side wall readout outserts (Density-SWRO), or neutron outserts, or acoustic outserts as previously noted. In some embodiments, the source holder 130 comprises tungsten or other high-z materials. The source holder is attached to the pressure housing 141 comprising Titanium Beta-C, or other low-z material, with the sensors and electronics housed therein. In some embodiments, the nuclear source 160 retained by the tungsten source holder comprises a Cesium-137 logging source. As previously described, the removable source holder 130 is attached to the pressure housing 141, such as by a shrink fit, to form a sensor package that is portable between different drill collars while maintaining a calibrated axial distance between the source 160 and the detectors 150, 152. Such a sensor package is applicable with all types of outserts consistent with the teachings herein. The calibrated sensor package 120 can be removed from one drill collar and re-inserted into another drill collar, of the same size or different size. Similarly, the integrated source holder 305 of the drill collar 302 provides a fixed position of the nuclear source in the drill collar that can be calibrated to the detectors or logging sensors in the outsert 340. Thus, in this embodiment, it is the outsert that is removable and interchangeable across different drill collars. Axial calibration of the nuclear source and detectors is easily achieved between the fixed position of the nuclear source and the known position of the outsert detectors, and radial proximity to the formation is maximized with the radially outward positions of the source and outsert detectors and radial positioning via the stabilizers 106, 306, 406. Consequently, consistent and reliable logging measurements can be achieved with the tools 100, 300 because of fixed and calibrated sensor components.

In some embodiments, the pressure housing 141 includes an outer surface protective coating of hardfacing material for close interaction with the formation and other wellbore dynamics. In some embodiments, the hardfacing material is positioned at discrete segments of the housing outer surface to prevent wear and surface cracking on the pressure housing due to contact with the formation. In some embodiments, the hardfacing will require a buffer layer to improve bonding and weldability of the hardfacing. The hardfacing may be applied using laser or TiG welding techniques. In certain embodiments, the hardfacing just described is applied to the outer surfaces of the drill collars 102, 302.

Figure 17:
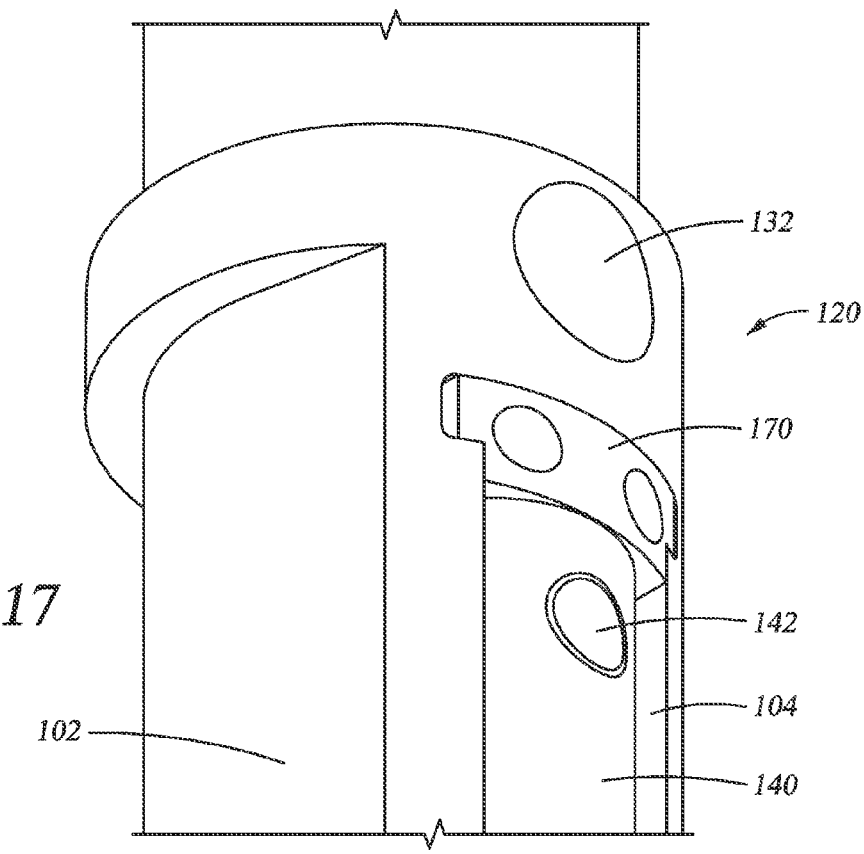
FIG. 17 shows a perspective view of an embodiment of a retained sensor package having a source emitting window and a detector window.
Figure 18:
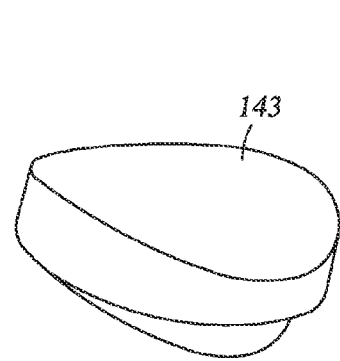
FIG. 18 shows a perspective view of a detector window of an embodiment of a detector window assembly in accordance with principles disclosed herein.
Figure 19:
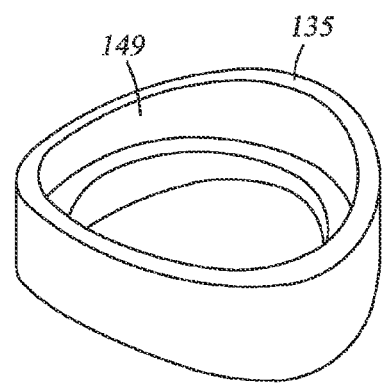
FIG. 19 shows a perspective view of a ring of the detector window assembly.
Figure 23:
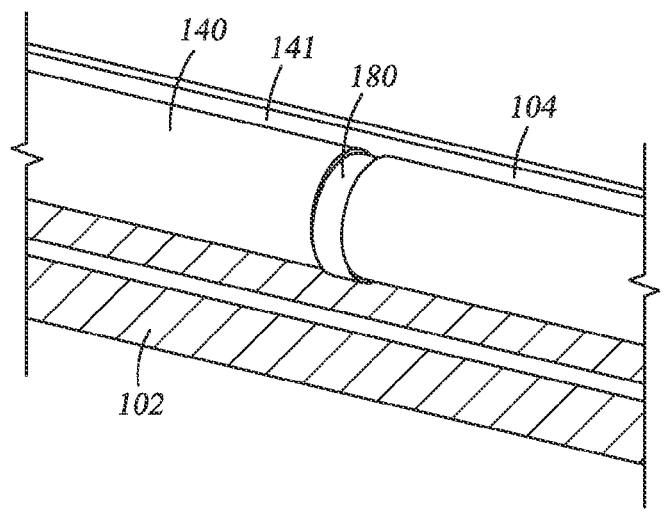
FIG. 23 shows a perspective view of an outsert having a wedge groove.
Figure 24:
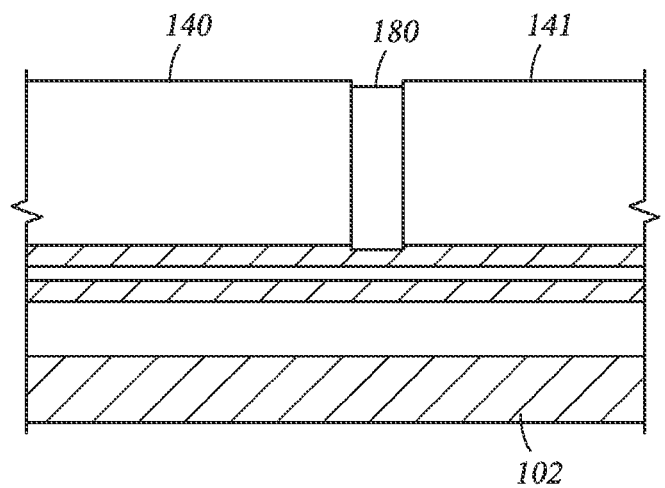
FIG. 24 shows a side view of the outsert of FIG. 23.
Figure 25:
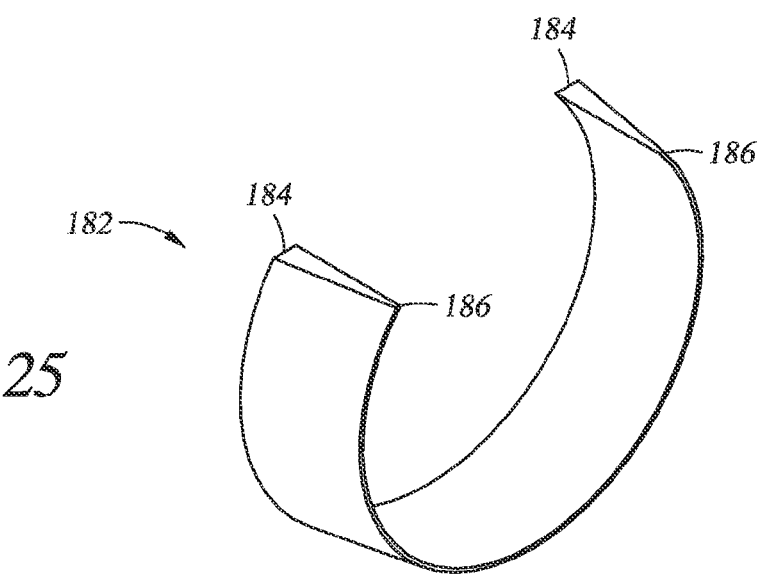
FIG. 25 shows a perspective view of a retention wedge.
Figure 26:
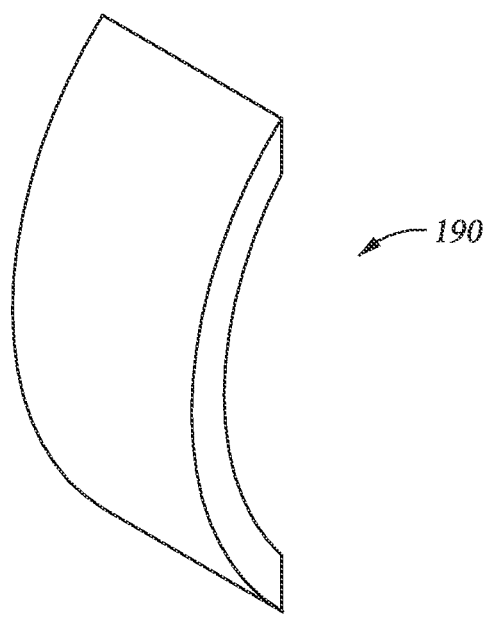
FIG. 26 shows a perspective view of a mating retention wedge.
Figure 27:
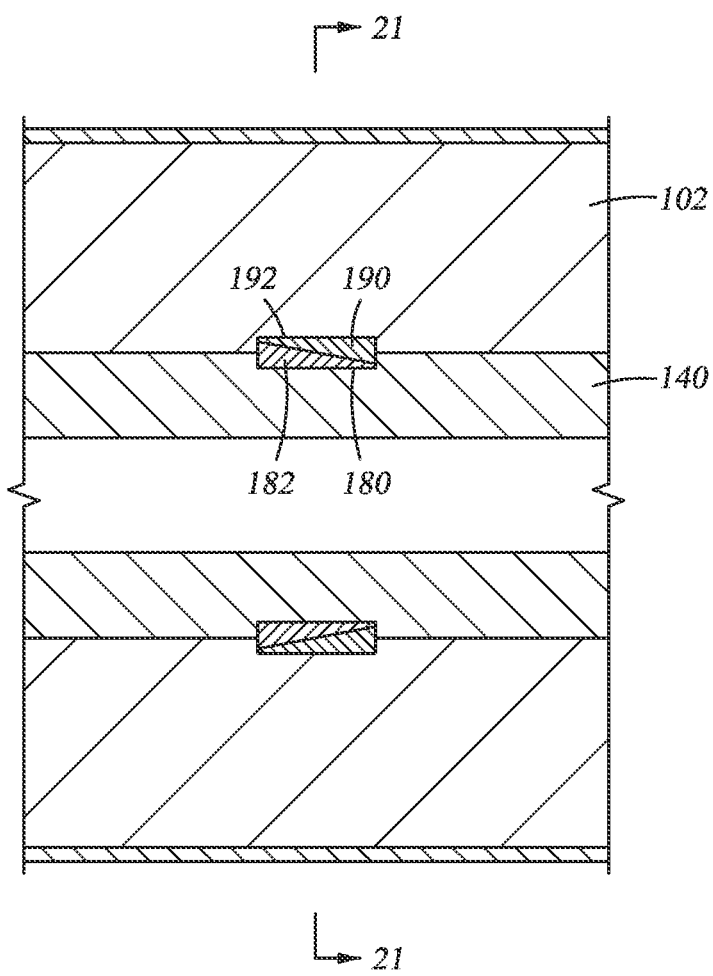
FIG. 27 shows an assembly of the retention wedges of FIGS. 25 and 26 disposed in the wedge groove of the outsert of FIG. 24.

Now with reference to FIGS. 17-21, in certain embodiments the detector window 142 comprises a low density material that permits capture of low energy gamma rays by the sensors housed in the outsert 140. For example, the window assembly 142 is an assembly of a window 143 and a ring 135. With reference to FIGS. 18-21, the window 143 comprises a member comprising a low-z material. The low-z window is attached to a rough machined Titanium Beta-C ring. The low-z window is furnace brazed into a recess 149 of the Titanium Beta-C ring 135 to form the assembly 142. In some embodiments, the brazing material comprises Ti—Cu—Ni. In some embodiments, the brazing is performed in an argon environment or vacuum. After brazing, the Titanium Beta-C ring 135 is finish machined. The assembly 142 is then electron beam welded to the pressure housing as shown in FIG. 17. The low density window withstands hydrostatic pressure in the wellbore with the aid of the collimation shielding 148 (FIG. 8) inside the pressure housing. In some embodiments, the collimation shield comprises tungsten. Thus, in some embodiments, the low density window does not require use of epoxy bonding or an o-ring for sealing.

The sensor package 120 includes various embodiments of retention mechanisms that can be used in any combination for desired results. The interlocking tabs 134 (FIGS. 9-11) machined directly into the source holder 130 mate with the receptacles 111, 112 (FIGS. 5 and 6) machined into the drill collar 102 for retention purposes. Additionally, the shoulder 136 of the source holder 130 is trapped by the end 108 of the stabilizer sleeve 106. The stabilizer sleeve 106 also restrains axial movement of the sensor package 120. Further, and with reference to FIG. 22, the source holder 130 or spacer block 170, 370 includes the bores 166 for receiving retention screws 167 that pass through the bores 166 and into the drill collar 102. The retention screws 167 include different sized o-ring grooves 169, 171 that create a pressure differential when the drill collar is subjected to downhole hydrostatic pressure, resulting in net force into the drill collar. The screws 167 are also called hydrostatic locking screws, The embodiments just described generally act at the source holder 130 to retain that end of the sensor package 120, while additional embodiments may act upon the outserts 140, 340 for retention. As previously described with respect to the integrated source holder portion 305, the finger retention members 355 can be used to retain the outserts while the source holder portion 305 is fixed as part of the drill collar 302. In some embodiments, a bolted retention member or spacer block 170, 370 is used as shown in FIGS. 12-15, 17, and 22.

Figure 28:
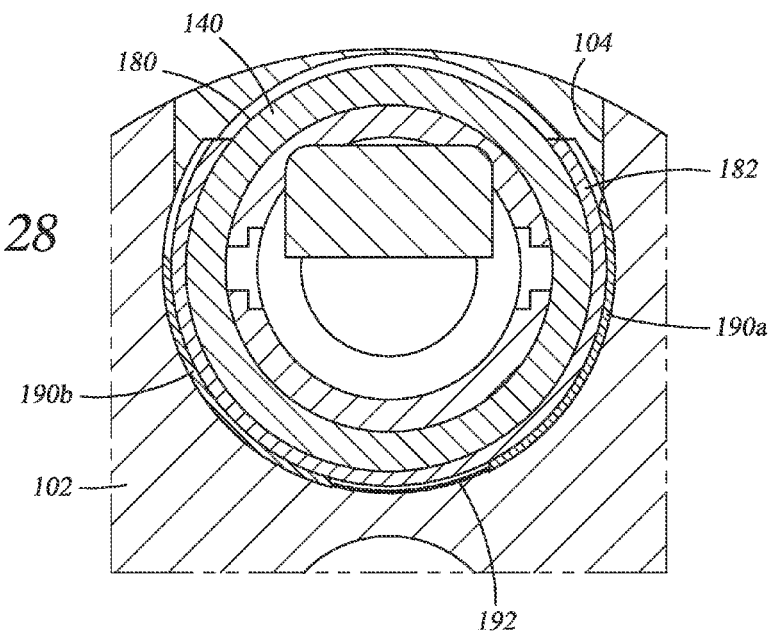
FIG. 28 shows a cross-section view of the assembly of FIG. 27 taken at the section 21-21.

Still further embodiments include securing mechanisms that eliminate the need for screws or bolts. For example, double mating wedges may be used in a confined space. Referring now to FIGS. 23-28, a wedge groove 180 is machined into the pressure housing 141 of the outsert 140. Also, a wedge groove 192 is machined into the outsert pocket 104 of the drill collar 102. A first outsert wedge 182 having a thick portion 184 and a reduced portion 186 is heat shrunk or otherwise fitted onto the outsert groove 180. The outsert 140 is then installed into the pocket 104, aligning the outsert wedge 182 with the drill collar groove 192 such that they mate. Next, a first drill collar wedge 190 (FIG. 26) is laid on top of the installed outsert 140 in an open portion of the outsert groove 180, as best seen in FIG. 28. The first drill collar wedge 190a is then rotated clockwise approximately 90 degrees, for example, to dispose it in the remaining space between the drill collar groove 192 and the outsert wedge 182 at the position shown in FIG. 28. In further embodiments, a second drill collar wedge 190b is installed in a similar manner, except that the second wedge is rotated counterclockwise approximately 90 degrees, for example, to place it in the position shown in FIG. 28. Because the mating and engaged wedges 182, 190a, 190b are in confined space, movement is limited to available tolerances. Furthermore, when the wedges are subjected to downhole hydrostatic pressure, the wedges are locked in place by the action of hydrostatic pressure on the end of the outsert.

Figure 29:
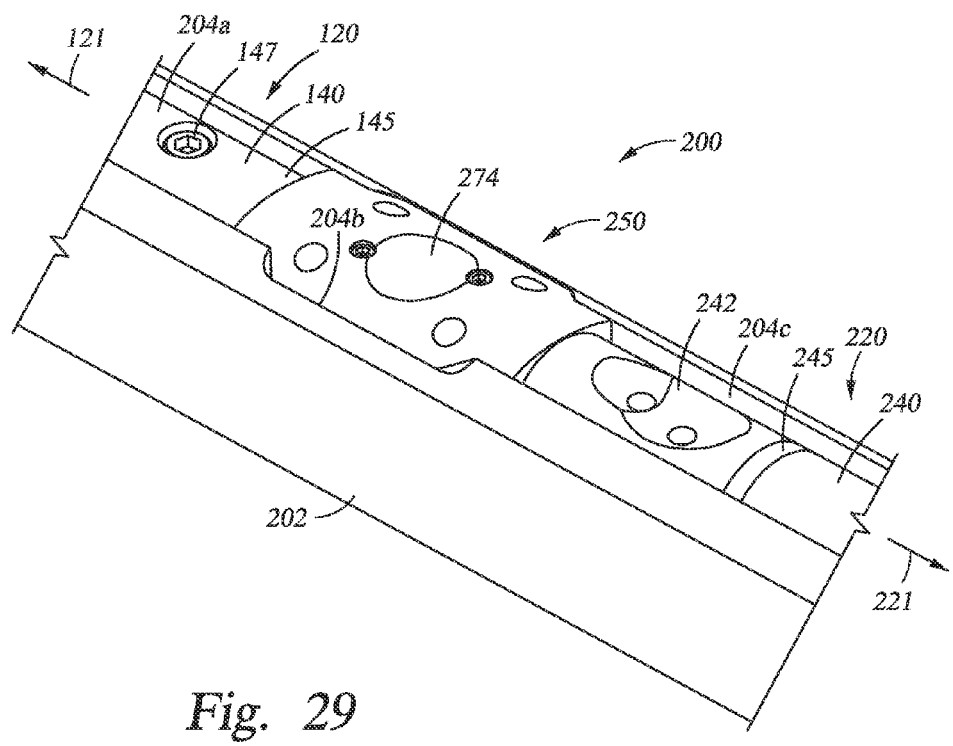
FIG. 29 shows a perspective view of another exemplary nuclear measurement tool, including embodiments of a density outsert and a neutron outsert, in accordance with principles disclosed herein.
Figure 30:
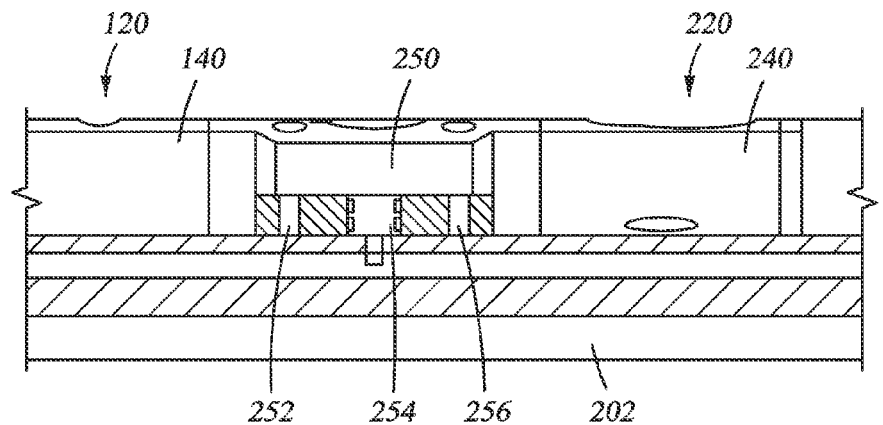
FIG. 30 shows a longitudinal cross-section of a portion of the tool of FIG. 29.
Figure 31:
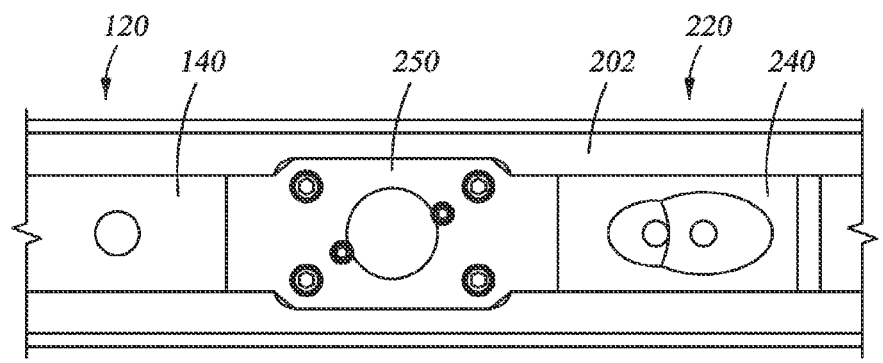
FIG. 31 shows a top view of a portion of the tool of FIG. 29.

Referring now to FIG. 29, another embodiment of a nuclear measurement tool is shown as tool 200. Tool 200 includes a drill collar or tool body 202 having pocket portions 204a, 204b, 204c. The pocket 204a receives and retains the sensor package 120 as previously described, wherein an arrow 121 represents extension of an end 145 of the outsert 140 to the components of the source holder end of the sensor package 120 as shown and described with reference to FIGS. 5-8, for example. The sensor package may also include the outsert and integrated source holder portion shown in FIGS. 12 and 13. In some embodiments, the outsert 140 is a Density-SWRO outsert including a sidewall readout port and plug 147. In other embodiments, the outsert 140 is various other outsert and logging sensors consistent with the teachings herein. Axially displaced from the sensor package 120 in the pocket 204c is a second sensor package 220 including an outsert 240. In some embodiments, the outsert 240 is a Pinger-Neutron or neutron porosity outsert. An end 245 of the outsert 240 may include a transceiver assembly 242. The end 245 extends axially, as represented by an arrow 221, toward components of the sensor package 220 similar to those of the source holder end of the sensor package 120 as shown and described with reference to FIGS. 5-8. The sensor package 220 includes a source holder coupled to a pressure housing retaining inner electronics and sensors, like the sensor package 120. The source holder retention mechanism described herein apply to the sensor package 220. Unlike the sensor package 120, embodiments of the package 220 include a source holder that is not made of a high-z material. Also, the nuclear source, in some embodiments, includes neutron logging source disposed in the receptacle. Furthermore, unlike the outsert 140, the outsert 240 does not require the low density window for passing through low energy gamma rays to the sensors. Also, the pressure housing of the outsert 240 may include a variety of nickel based alloys, rather than Titanium Beta-C. Various combinations of materials as described herein can be used for desired results.

Figure 32:
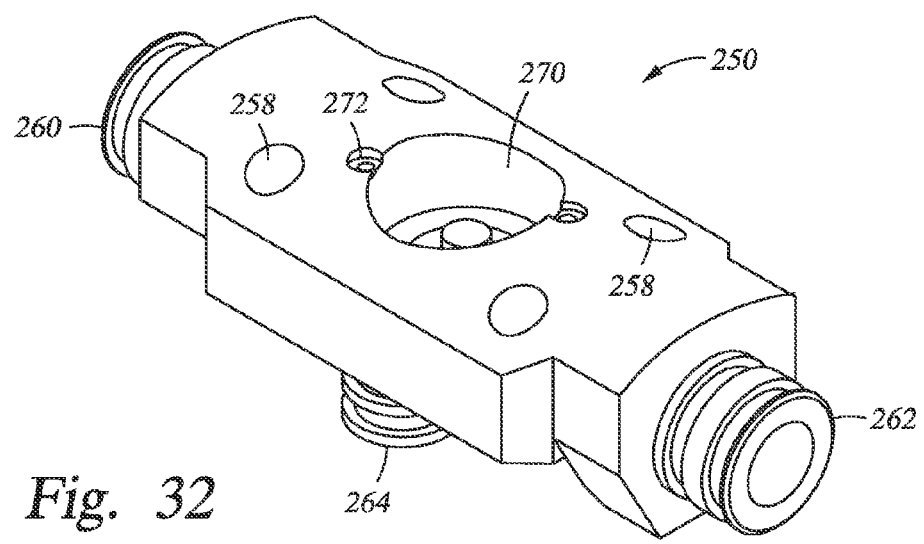
FIG. 32 shows a perspective view of the interconnect junction of the tool of FIG. 29.
Figure 33:
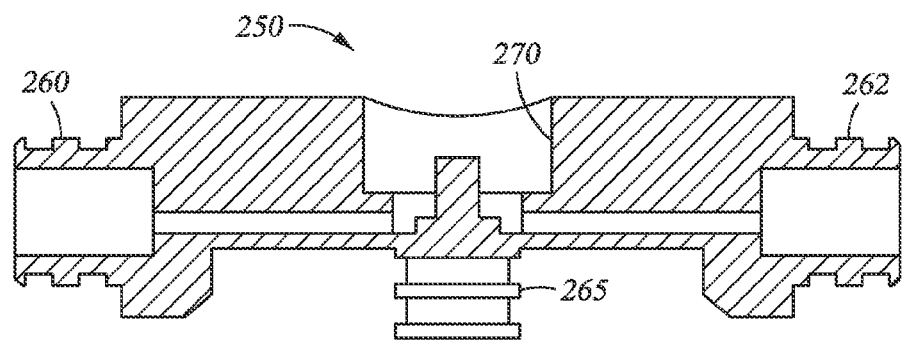
FIG. 33 shows a longitudinal cross-section of the junction of FIG. 32.
Figure 34:
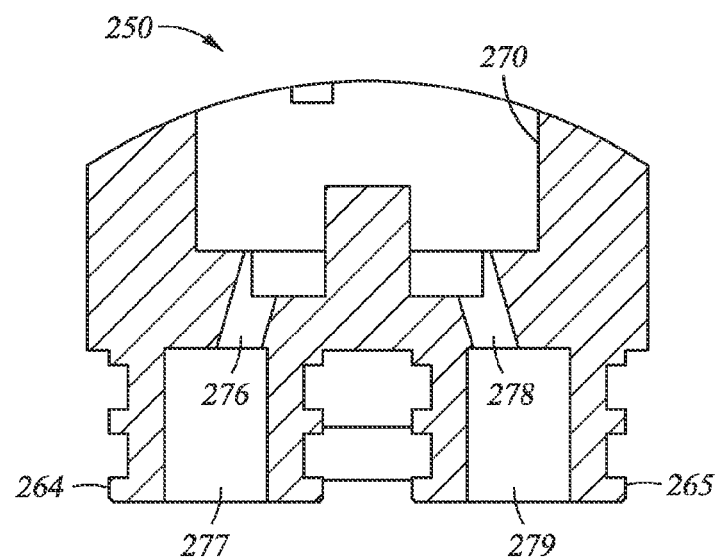
FIG. 34 shows a radial cross-section of the junction of FIG. 32.

Still referring to FIG. 29, disposed between the outsert sensor packages 120, 200 is a bulkhead or interconnect junction 250. The junction 250 serves as a manifold, providing electrical connections between and among the outserts 140, 240 and the drill collar 202. The junction 250 further serves as a retention mechanism in a radial manner for the outsert ends 145, 245 and in an axial manner for the outserts 140, 240. Referring to FIGS. 30-34, the junction 250 connects between the outserts 140, 240 and provide multiple passageways 252, 254, 256 for electrical conduits. As shown in FIG. 32, the junction 250 includes bosses 260, 262 for receiving and coupling to the ends of the outserts 140, 240. In some embodiments, the coupling is similar to that described for the boss 138 of the source holder 130 and the end 144 of the outsert 140. The junction 250 also includes bosses 264, 265 for coupling to the drill collar 202. The bosses include passageways for carrying electrical connections and conduits, such as passageways 276, 277, 278, 279. An upper access cavity 270 may be covered by a cover 274 secured by screws threaded into bores 272. The junction 250 may be secured to the tool 200 by screws threaded into bores 258.

Certain embodiments described herein provide, for example, a downhole sensor outsert package that can deploy a nuclear or other measure system in close proximity to the formation, and maintain a substantially uniform distance to the formation between different drill collars and drill collars of different sizes. Further, calibration of the nuclear sources and logging sensors can be attained via the assembly sensor package or the outserts adapted to correspond to the fixed position of the integrated source holder portion of the drill collar. Certain embodiments provide for capturing low-energy gamma rays and transferring calibrations associated therewith between drill collars of the same or different sizes.

The detectors described herein are packaged in a sealed pressure housing called an outsert. The sealed housing, or outsert, is connectable with a tool body interface. In certain embodiments, the outsert is coupled with a source holder to provide a removable and portable sensor package for nuclear measurement systems which require a nuclear source and spaced apart detectors. The removability and sealed nature of the sensor outsert package allow the outsert package to be a standard component used across a plurality of tool sizes, even for nuclear measurements. Further, the outsert alone can be interchanged among drill collars and easily acclimated and calibrated to the integrated source holder of the drill collar portion 305. The low density window, sealed as described herein, allows the sealed pressure outsert to be used for nuclear measurements while drilling. For example, the same gamma detector outsert may be used in a number of different tools of varying sizes. Further, the outsert hardware can be standardized for use with multiple measurements. For example, the detectors and electronics are unique for a gamma outsert relative to a Drilling Dynamics Sensor (DDS); however, the pressure housing, seals, connectors, connection interface, collar locking mechanism and other hardware are the same for each type of measurement. Also, the length of the outserts can be easily varied.

The above discussion is meant to be illustrative of the principles and various embodiments of the disclosure. Numerous variations and modifications will become apparent to those skilled in the art once the above disclosure is fully appreciated. It is intended that the following claims be interpreted to embrace all such variations and modifications.

What is claimed is:

1. A downhole measurement apparatus comprising:
a tool collar including an exposed pocket formed along an exterior surface of said tool collar;
a sensor package including a detector removably insertable within the exposed pocket so as to maintain calibrated axial and radial positioning of said detector with respect to said exterior surface of said tool collar; and
a stabilizer sleeve slideably disposed about said exterior surface of said tool collar so as to be positionable over a portion of said exposed pocket to retain said sensor package within said exposed pocket.

2. The apparatus of claim 1 wherein the sensor package further includes a logging source to communicate with the detector.

3. The apparatus of claim 2 wherein the detector is calibrated relative to the logging source.

4. The apparatus of claim 1 wherein the sensor package further includes a pressure-sealing outsert housing the detector.

5. The apparatus of claim 1 wherein the stabilizer is operable to deflect the tool collar toward an earth formation.

6. The apparatus of claim 1 further comprising a retention member including any one or more of a hydrostatic locking screw coupling the sensor package to the tool collar, a spacer block coupled between the sensor package and the tool collar, a finger retention mechanism coupling the sensor package in the exposed pocket, an interlocking wedge mechanism coupling the sensor package in the exposed pocket, and an interconnect junction coupling a first outsert of the sensor package to a second outsert of the sensor package in the exposed pocket.

7. A downhole measurement system comprising:
first and second tool collars each including an exposed pocket formed along an exterior surface and a stabilizer sleeve slideably disposed about said exterior surface so as to be positionable over a portion of said exposed pocket; and
a sensor package including a detector removably and selectively insertable within the exposed pockets of said first and second tool collars so as to maintain calibrated axial and radial positioning of said detector with respect to said exterior surfaces of said first and second tool collars, respectively; wherein
said stabilizer sleeves are operable to retain said sensor package within said exposed pockets of said first and second tool collars, respectively.

8. The system of claim 7 further comprising a logging source to communicate with the detector.

9. The system of claim 8 wherein the detector is axially calibrated relative to the logging source.

10. The system of claim 8 wherein said sensor package includes said logging source.

11. The system of claim 8 wherein said logging source is selectively insertable within the exposed pockets of said first and second tool collars.

12. The system of claim 7 wherein said sensor package further includes a pressure-sealing outsert housing the detector.

* * * * *